UNITED STATES PATENT OFFICE.

HARVEY B. VARNS, OF WASHINGTON, ASSIGNOR TO EDWARD P. WELCH, JAMES H. WELCH, ROSIA W. WELCH, CHARLES REED, JAMES P. WILLETT, AND EDMUND P. HANN, OF GEORGETOWN, DISTRICT OF COLUMBIA, ONE-SEVENTH TO EACH.

IMPROVEMENT IN THE PROCESS OF CLEANSING MILLSTONES.

Specification forming part of Letters Patent No. 208,441, dated September 24, 1878; application filed September 16, 1878.

*To all whom it may concern:*

Be it known that I, HARVEY B. VARNS, of Washington, in the county of Washington, and in the District of Columbia, have invented certain new and useful Improvements in Modes of Cleansing Millstones; and do hereby declare that the following is a full, clear, and exact description thereof.

The nature of my invention consists in the application of a commercial article known to the trade as "hydrofluoric acid," sometimes called "fluoric acid," to the grinding-surface of millstones, for the purpose of cleansing them of glaze, and at the same time opening the pores or granulations of same, as will be hereinafter set forth.

To enable others to use my invention, I will proceed to describe my mode of manipulation.

The stones are first placed in horizontal position, face upward, and after being dusted, or washed if necessary, hydrofluoric acid is used as a coating for the entire face. After the acid has remained upon the stone a sufficient length of time to remove the glaze, it is washed off with water, and the stone is ready for use.

I generally apply the acid on the stone at different points, and then take a brush and spread it over the entire surface of the same. It is then allowed to remain from thirty to fifty minutes, according to the kind and condition of the stone.

The glaze, it will be found, is not only removed, but the granulations of the stone will appear in perfect condition for work, and that without the use of a pick or other instrument.

I may use ammonia with fluoric acid or ammonium-fluoride, or I may use other combinations with fluoric acid as an element.

I am aware that fluoric acid has been used for etching glass. I am also aware that fluoric acid has been used for cutting grooves in millstones; but I am not aware that my improved process has ever before been used whereby the entire grinding-surface of a millstone has been cleansed and sharpened and the pores of the stone opened, and the entire surface of the stone thereby placed in a condition to operate perfectly without the use of a mechanical millstone-dresser.

Having thus fully described my invention, what I claim as new, and desire to secure by Letters Patent, is—

1. The within-described mode of cleansing millstones with hydrofluoric acid, substantially as set forth.

2. For cleansing millstones, hydrofluoric acid in any of its compounds, for the purpose as set forth.

In testimony that I claim the foregoing I have hereunto set my hand this 16th day of September, 1878.

HARVEY B. VARNS.

Witnesses:
FRANK GALT,
H. AUBREY TOULMIN.